United States Patent [19]

Hayward

[11] Patent Number: 4,571,880

[45] Date of Patent: Feb. 25, 1986

[54] ACCESS STRUCTURE FOR USE IN TRAPPING FLYING INSECTS, AND FLY TRAP INCLUDING SUCH STRUCTURE

[76] Inventor: John J. P. Hayward, 37 Union Ave., Union Park, Stellenbosch, South Africa

[21] Appl. No.: 613,784

[22] Filed: May 24, 1984

Related U.S. Application Data

[63] Continuation-in-part of Ser. No. 416,321, Sep. 9, 1982, abandoned.

[30] Foreign Application Priority Data

Sep. 16, 1981 [ZA] South Africa .................... 81/6440

[51] Int. Cl.[4] .............................................. A01M 1/10
[52] U.S. Cl. ..................................................... 43/122
[58] Field of Search ................. 43/122, 107, 121, 112

[56] References Cited

U.S. PATENT DOCUMENTS

| 1,011,347 | 12/1911 | Humpal | 43/122 |
| 1,093,599 | 4/1914 | Beebe | 43/122 |
| 1,772,729 | 8/1930 | Pisani | 43/122 |
| 1,772,989 | 8/1930 | Emley | 43/107 |
| 1,823,892 | 9/1931 | Galbraith | 43/112 |
| 4,218,842 | 8/1980 | Anderson | 43/122 |

FOREIGN PATENT DOCUMENTS

85185 3/1955 Norway .................... 43/122

Primary Examiner—Gene P. Crosby
Attorney, Agent, or Firm—Lewis H. Eslinger

[57] ABSTRACT

An access structure 10 for use in trapping flying insects comprises a lid member 12 having a horizontal top portion 24, an access opening 26 in the top portion, and a downwardly depending tubular wall 28 defining a downwardly open passage 30 leading from the access opening. A cover member 14 which is spaced upwardly from the top portion 24 forms a roof over the access opening 26. Between the top portion 24 and the cover member 14 there are four vanes 32 which extend radially from the access opening. In one embodiment the top portion is provided with a skirt portion 34 having formations 38, which enables the structure to be screwed onto a glass jar. In use, an insect attractant is placed in the jar. This attracts insects, which enter the jar via the access opening 26 and the passage 30, are unable to find their way back through the access opening, and eventually die in the jar. In another embodiment a trapping container having a perforated bottom wall is connected to the access structure, and a bait holder is connected to the bottom of the trapping container.

10 Claims, 6 Drawing Figures

4,571,880

ACCESS STRUCTURE FOR USE IN TRAPPING FLYING INSECTS, AND FLY TRAP INCLUDING SUCH STRUCTURE

This is a continuation-in-part application of application Ser. No. 416,321 filed Sept. 9, 1982, now abandoned.

BACKGROUND OF THE INVENTION

This invention relates to an access structure for use in trapping flying insects, and to a fly trap assembly which includes such a structure.

SUMMARY OF THE INVENTION

According to the invention there is provided an access structure for use in trapping flying insects, the device comprising:

a lid member having a horizontal top portion in which there is an access opening for the passage therethrough of flying insects;

a cover member spaced upwardly from the top portion, and being arranged to form a roof over the access opening; and at least two upright vanes disposed in the space between the top portion and the cover member, the vanes converging to the access opening.

The access opening may be arranged centrally of the top portion, there being at least three of said vanes, the vanes being equally circumferentially spaced and extending radially from the access opening.

Further according to the invention there is provided a fly trap assembly for use in trapping flying insects, the assembly comprising:

a trapping container;

an access structure for providing said insects with access to the interior of the trapping container; and a bait holder for holding a source of airborne insect attractant, there being a perforated wall separating the interior of the trapping container from the interior of the bait holder, the perforations in said wall being of restricted size so as to permit the passage therethrough of the airborne attractant but to prevent the passage therethrough of said insects; and the access structure including a lid member having a horizontal top portion in which there is an access opening for providing said access, a cover member spaced upwardly from the top portion and being arranged to form a roof over the access opening, and at least two upright vanes disposed in the space between the top portion and the cover member, the vanes converging to the access opening.

The bait holder may be disconnectably connected to the trapping container, said perforated wall forming part of the trapping container. The trapping container may in turn be disconnectably connected to the access structure.

BRIEF DESCRIPTION OF THE DRAWINGS

The invention will now be described in more detail, by way of example, with reference to the accompanying drawings.

In the drawings.

DETAILED DESCRIPTION OF THE DRAWINGS

Figure 1:
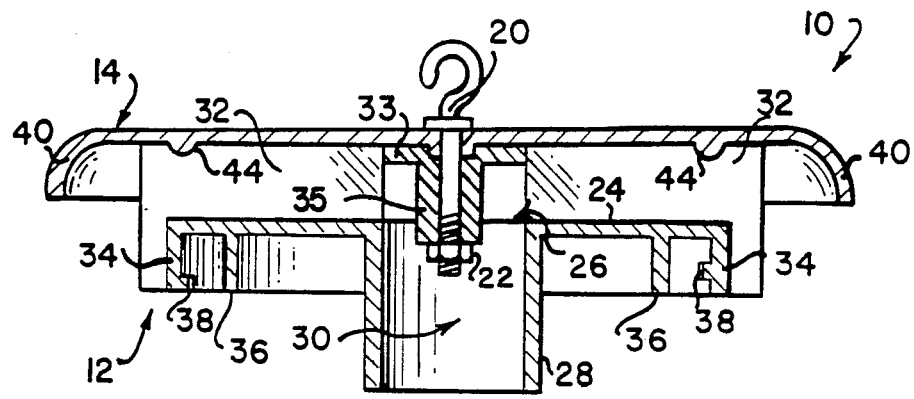
FIG. 1 is a vertical section of an access structure for use in trapping flying insects, the section being taken on line I—I in FIG. 2.
Figure 2:
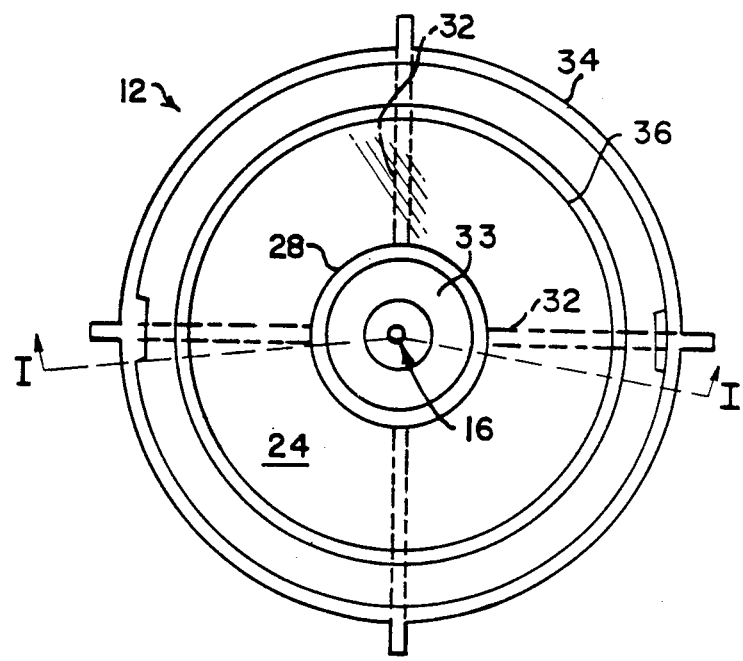
FIG. 2 is an underneath view of a lid member forming part of the device.
Figure 3:
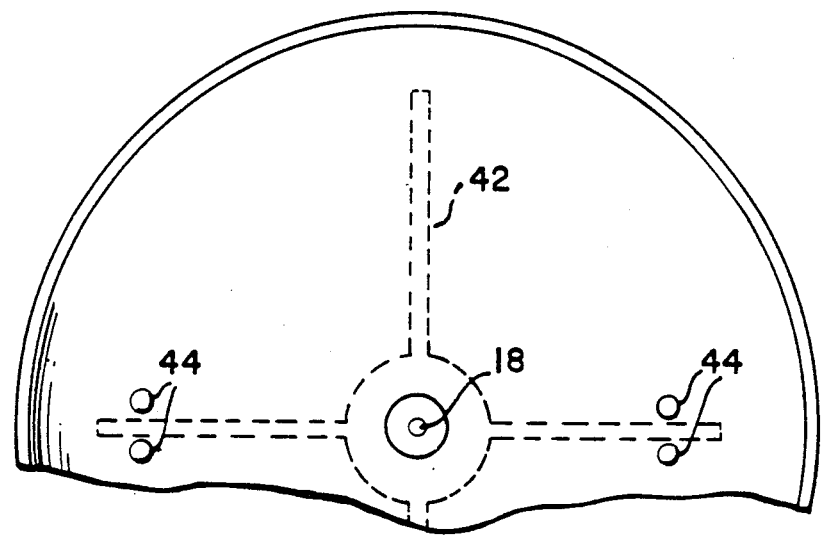
FIG. 3 is a broken underneath view of a cover member forming part of the access structure.

Referring first to FIGS. 1 to 3 of the drawings, reference numeral 10 generally indicates an access structure for use in trapping flying insects, the structure being a dark coloured plastics moulding which is in two parts, namely a bottom part 12 forming a lid member, and a top part 14 forming a cover member. The parts 12 and 14 each have a small hole 16 and 18 respectively in the centre thereof. A screw-threaded end of a metal hook 20 can pass through these two holes and, together with a nut 22 or other fixing device, serves to secure the two parts together, as will clearly be seen in FIG. 1.

The lid member 12 comprises a horizontal top portion 24 having, at the centre, an access opening 26 therein. From the top portion 24 there depends a round tubular wall 28 which defines a downwardly open passage 30 leading from the access opening 26.

The lid member 12 further comprises four radially extending, upright vanes 32. The vanes 32 are disposed at right angles to one another and extend the full height between the top portion 24 and the cover member 14. The vanes 32 also extend from the periphery of the access opening 26 to slightly beyond the periphery of the top portion. In the centre, the vanes 32 are joined by an integrally formed, disc-shaped portion 33 which is spaced above the access opening 26. From the disc shaped portion 33 there depends a cylindrical portion 35, the portion 35 having an outside diameter which is less than the inside diameter of the passage 30 and extending partly into the passage. The portion 35 serves to deflect inflowing air, from whichever direction it comes, downwardly into the passage 30.

The lid member 12 has two concentric skirts 34 and 36 whereby the lid member can be fitted over the mouth of a suitable container such as a preserve jar (not shown). The outer, peripheral skirt 34 has inwardly extending projections 38 which are adapted to engage with a screw-thread on the neck of the jar. The inner skirt 36 will permit the use of other smaller jars and may, if required, also have inwardly extending projections similar to the projections 38.

The cover member 14 extends peripherally beyond the top portion 24 and has a downturned peripheral edge 40. Together with the disc-shaped portion 33, it forms a roof over the access opening 26, so as to prevent rain from entering the jar.

In use, an attractant is placed in a suitable jar and the access structure 10 secured over the mouth of the jar by the formations 38 engaging with the screw-threaded neck of the jar. The assembly comprising the access structure 10 and the jar is then suspended by means of the hook 20. Wind blowing across the jar will enter the space between the cover member 14 and the top portion 24. The two vanes 32 which face in the direction from which the wind comes, will, together with the top portion 24 and the cover member 14, direct some of the air entering the space, through the access opening 26 into the interior of the jar, and thus slightly increase the pressure in the jar. On the leeward side of the jar, the wind will cause air containing some of the attractant to be extracted from the jar through the access opening 26. Flying insects attracted by the attractant will enter the jar through the access opening 26 and the passage 30. The opening 26 and the passage 30 are sufficiently large for the insects which are to be trapped to pass therethrough. It has been found that once the insects are in the jar, they will try to leave it by crawling up the side towards the underside of the top portion 24. As most of them are unable to find their way back to the access opening 26, they eventually die.

Dotted lines 42 in FIG. 3 delineate a slightly recessed area (not shown in FIG. 1) for locating the cover member 14 in position relative to the lid member 12. Further location is provided by small raised portions 44 on the underside of the cover member 14.

By using suitable attractants, the device can, for example, be used for insects such as codling moth, false codling moth, and a wide spectrum of flies, including house flies and fruit flies.

Figure 4:
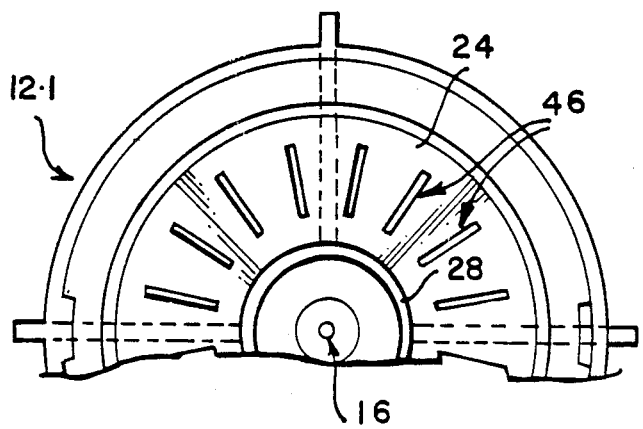
FIG. 4 is a broken underneath view of a modified lid member for use with the cover member of FIG. 3.

The lid member 12.1 illustrated in FIG. 4 differs slightly from that illustrated in FIG. 2 in that the top portion 24 is, radially outwardly of the tubular wall 28, provided with a plurality of radially extending, narrow slots 46 therein which are sufficiently narrow to prevent trapped insects from escaping therethrough. These openings need not be in the form of slots. They could be of any other suitable shape, provided they do not permit trapped insects to escape therethrough. The lid member 12.1 will be used with a cover member 14 as shown in FIGS. 1 and 3.

Figures 5, 6:
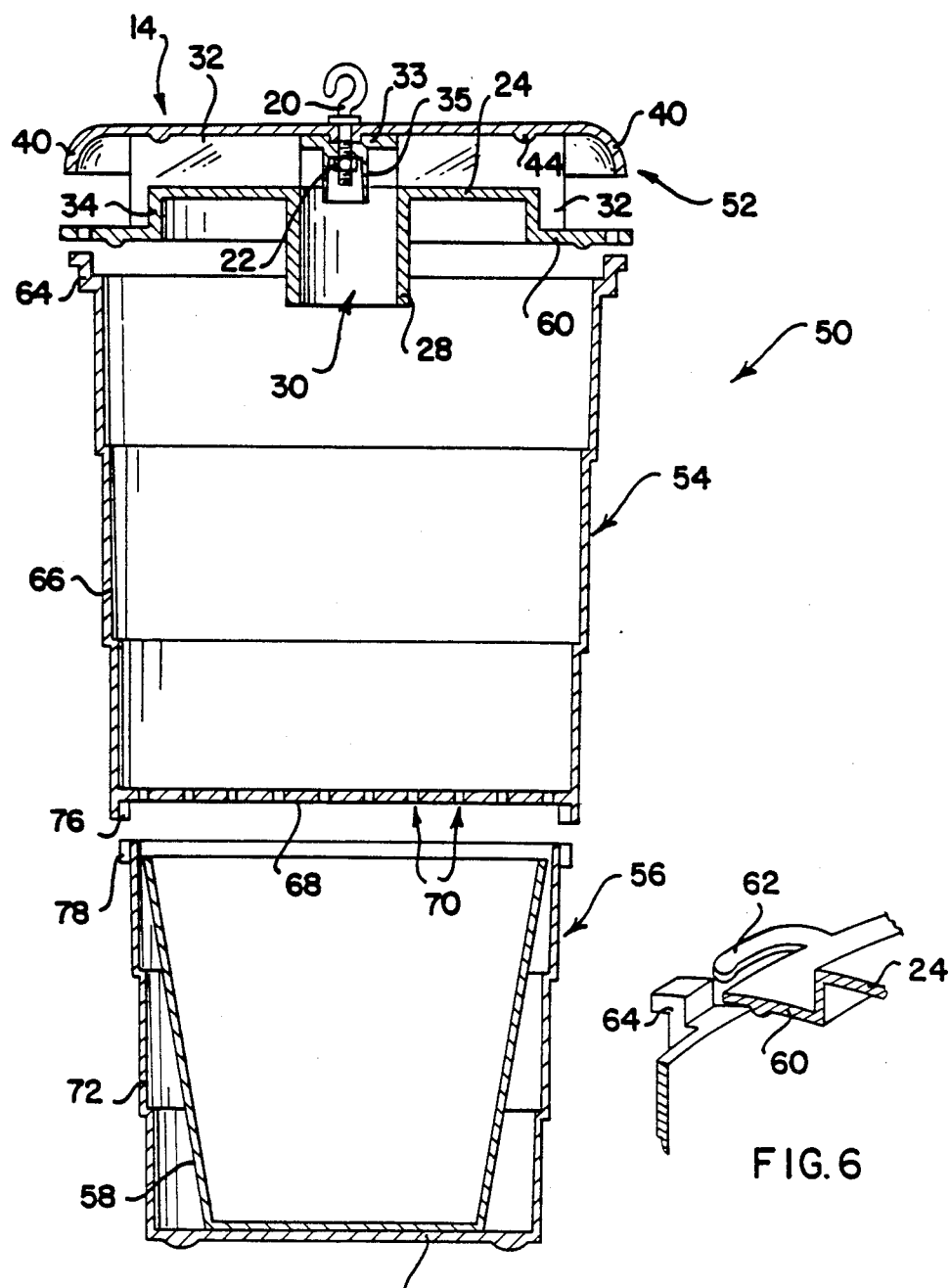
FIG. 5 is an exploded, vertical section of a fly trap assembly according to the invention.
FIG. 6 is a three-dimensional view of certain parts of the assembly, illustrating their interconnection.

Referring now to FIGS. 5 and 6, reference numeral 50 generally indicates a fly trap assembly for use in trapping flying insects, the assembly comprising an access structure 52 similar to that illustrated in FIGS. 1 to 3, a trapping container 54, and a bait holder 56. The trapping container 54 is of a clear, moulded plastics material, whereas the bait holder 56 is of an opaque moulded plastics material. Inside the bait holder 56 there is a disposable bait container 58 which may, for example, be in the form of a paper cup.

As the access structure 52 is similar to the structure 10 shown in FIGS. 1 to 3, it will not again be described fully but only to the extent that it differs from the structure 10. The same reference numerals as in FIGS. 1 to 3 are used to designate the same or similar parts. Instead of the inner skirt 36 and the projections 38, there is an annular flange 60 which extends outwardly from the lower end of the skirt 34. The flange 60 is provided peripherally with a number of circumferentially spaced formations 62 which are engageable with co-operating formations 64 on the rim of the trapping container 54, as illustrated in FIG. 6. The cylindrical portion 35 is hollow so as to reduce the bulk of the structure and to permit the nut 22 to be accommodated therein.

The trapping container 54 has a stepped, cylindrical side wall 66 and a perforated bottom 68, the perforations in the bottom being indicated by reference numeral 70.

The bait holder 56 has a stepped cylindrical side wall 72, and a closed bottom 74.

The access structure 52 and the trapping container 54 can be connected to, or disconnected from, one another by twisting the two parts relative to one another. Similarly, the container 54 and the holder 56 can be connected to, or disconnected from, one another by twisting the two parts relative to one another, by virtue of the container 54 and the holder 56 having complementary formations 76 and 78 respectively.

In use of the fly trap assembly 50, an attractant such as raw meat or fish covered by water is placed in the paper cup 58, the cup inserted into the bait holder 56, and the parts 52, 54, and 56 assembled as described above. The assembly can then be suspended by means of the hook 20, or made to stand on a supporting surface. Insects attracted by the odour given off by the meat or fish then enter the trapping container 54 through the access opening 26, as described with reference to FIGS. 1 to 3, and are unable to leave it again. The openings 70 are small enough to prevent the insects from leaving the container 54 through the bottom 68. Accordingly, the insects cannot gain access to the bait. They are thus kept alive much longer than in traps where they are allowed to gain access to the bait and drown in the water which is used with the bait. This allows the insects time to produce significant quantities of pheromone (a sex attractant) which is a powerful supplement to the attraction provided by the bait odour.

The trapping container 54 can easily be cleaned by disconnecting it from the part 52 and by tipping it over.

To clean the bait holder 56, it is disconnected from the trapping container 54, whereupon the disposable cup 58 can be removed and discarded. This obviates the unpleasant task of washing the holder 56.

I claim:

1. An access structure for use in trapping flying insects, the device comprising:
    a lid member having a horizontal top portion in which there is an access opening for the passage therethrough of flying insects;
    a cover member spaced upwardly from the top portion, and being arranged to form a roof over the access opening; and
    at least two upright vanes disposed in the space between the top portion and the cover member, the vanes converging to the access opening.

2. A structure according to claim 1, wherein each vane extends the entire height between the top portion and the cover member.

3. A structure according to claim 2, wherein each vane extends from the periphery of the access opening to at least the periphery of the top portion.

4. A structure as claimed in claim 1, wherein the access opening is arranged centrally of the top portion and wherein there are at least three of said vanes, the vanes being equally circumferentially spaced and extending radially from the access opening.

5. A structure according to claim 1 or claim 4, wherein the lid member further has a tubular wall which depends downwardly from the top portion and defines a downwardly open passage for insects, leading from the access opening.

6. A structure as claimed in claim 1, wherein the cover member extends to at least the periphery of the top portion.

7. A structure as claimed in claim 6, wherein the cover member has a downturned peripheral edge.

8. A fly trap assembly for use in trapping flying insects, the assembly comprising:
    a trapping container;
    an access structure for providing said insects with access to the interior of the trapping container; and
    a bait holder for holding a source of airborne insect attractant, there being a perforated wall separating the interior of the trapping container from the interior of the bait holder, the perforations in said wall being of restricted size so as to permit the passage therethrough of the airborne attractant but to prevent the passage therethrough of said insects; and the access structure including a lid member having a horizontal top portion in which there is an access opening for providing said access, a cover member spaced upwardly from the top portion and being arranged to form a roof over the access opening, and at least two upright vanes disposed in the space between the top portion and the cover member, the vanes converging to the access opening.

9. A fly trap assembly according to claim 8, wherein the bait holder is disconnectably connected to the trapping container, said perforated wall forming part of the trapping container.

10. A fly trap assembly according to claim 9, wherein the trapping container is disconnectably connected to the access structure.

* * * * *